July 12, 1966 G. W. FARABEE 3,260,147

RESILIENT CUTTING MECHANISM FOR CUTTING THE TURNED-UNDER EDGE OF A DOUBLE LAYER OF MATERIAL

Filed July 30, 1964 2 Sheets-Sheet 1

INVENTOR:
GEORGE W. FARABEE

BY Parrott, Bell, Seltzer, Park & Heard
ATTORNEYS

RESILIENT CUTTING MECHANISM FOR CUTTING THE TURNED-UNDER EDGE OF A DOUBLE LAYER OF MATERIAL
Filed July 30, 1964 2 Sheets-Sheet 2
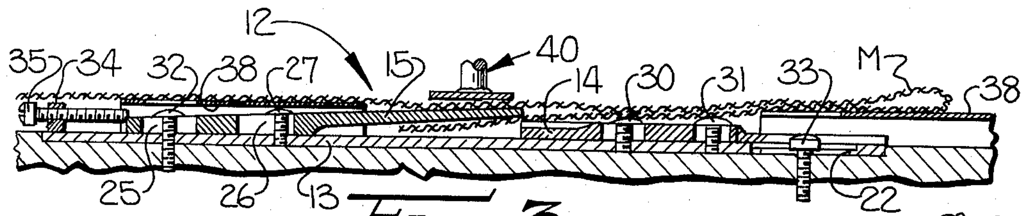
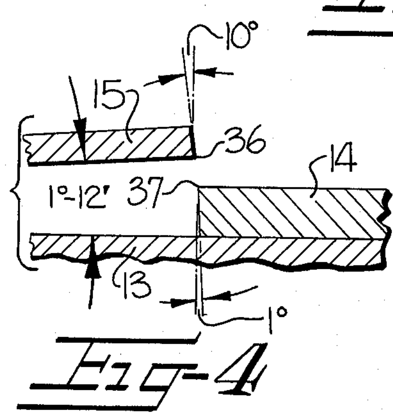
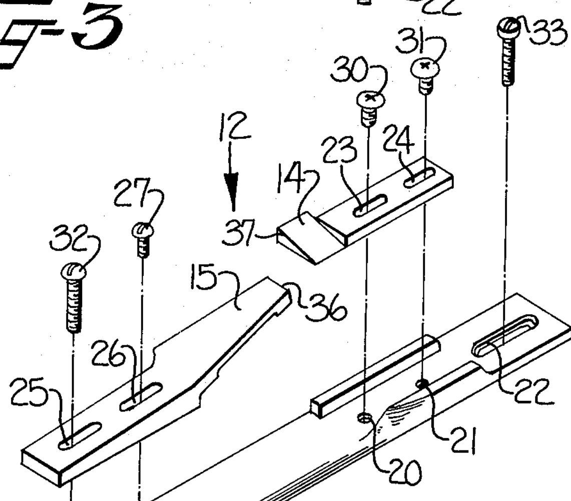
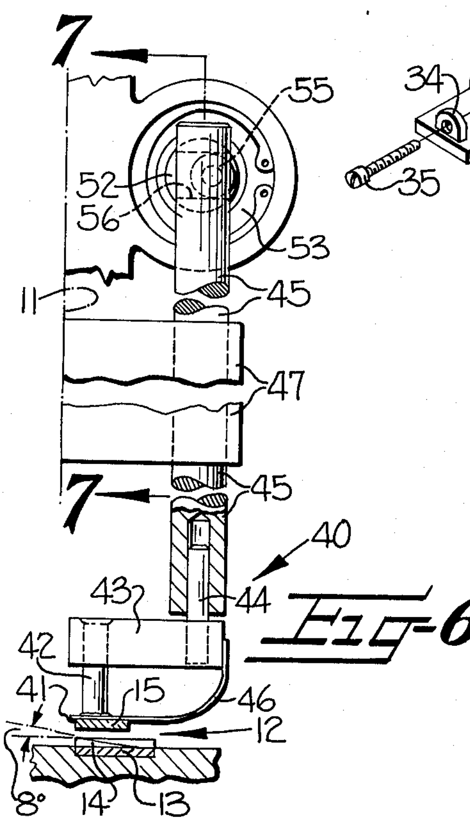
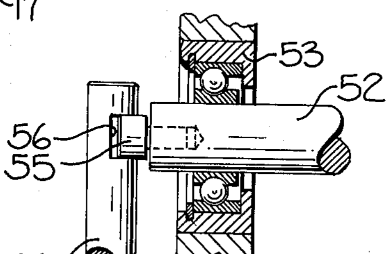
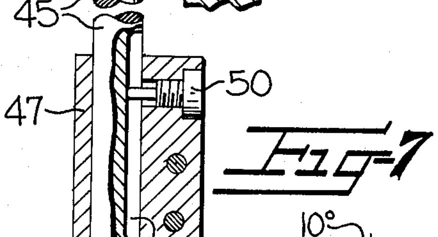
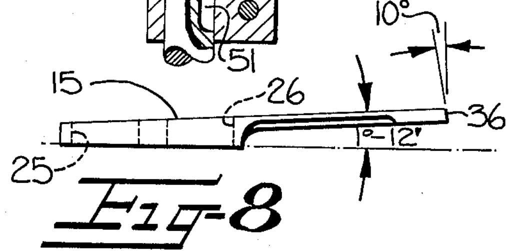

United States Patent Office 3,260,147

Patented July 12, 1966

3,260,147

RESILIENT CUTTING MECHANISM FOR CUTTING THE TURNED-UNDER EDGE OF A DOUBLE LAYER OF MATERIAL

George W. Farabee, Mooresville, N.C., assignor to Cannon Mills Company, a corporation of North Carolina Filed July 30, 1964, Ser. No. 386,176
3 Claims. (Cl. 83—542)

This invention relates to a cutting mechanism and more particularly to a cutting mechanism for trimming or cutting the turned under free edge of material as it passes through the cutting mechanism.

In many textile products, especially those with a hemmed edge such as pillowcases, sheets, draperies, garments, or the like, an excess of material is generally left beyond the hem on the turned under free edge. This excess of material is objectionable in the finished product in that it may curl or hang down and produce undesirable and unsightly bulges and irregularities in the finished product.

Numerous trimming and cutting devices are available for trimming or cutting different types of materials. However, none of these prior devices are adapted to trim the turned under free edge only of folded under material which has been hemmed, or is to be hemmed, or is turned under for any desired purpose. Therefore, trimming of the excess material from the turned under free edge of folded material has heretofore had to be done manually by an operator. The manual trimming or cutting constituted a loss of time and additional expense in the manufacturing of various products which is undesirable to a manufacturer.

Therefore, it is an object of this invention to provide a mechanism for trimming the turned under free edge of folded material.

A more specific object of this invention is to provide a cutting mechanism of the type described comprising a cutter member disposed in a stationary frame of the mechanism and having cutter blades adapted to have one layer of the turned under edge disposed on top of the cutter blades and the free turned under edge disposed between the cutter blades, and a presser or hammer mechanism for contacting the cutter blades through the top layer of material to effect cutting of the turned under free edge of material only.

It may thus be seen that a cutting or trimming mechanism is provided which will trim the turned under free edge only of material which is folded in a double layer, thus eliminating the necessity for manual trimming of this turned under free edge.

Further features of this invention will be understood from the following more detailed description when taken in conjunction with the accompanying drawings, in which:

FIGURE 3 is a view taken substantially along the lines 3—3 of FIGURE 2 and illustrating how the turned under web of material passes through the cutter blades;

FIGURE 4 is an enlarged central portion of FIGURE 3 illustrating the angles formed by the cutting surfaces of the cutter blades;

FIGURE 5 is an exploded perspective view of the cutter member of this invention;

FIGURE 6 is a front elevational view broken away of the cutter mechanism;

FIGURE 7 is a view taken substantially along the lines 7—7 of FIGURE 6, and

FIGURE 8 is a side view of the movable blade.

Figure 1:
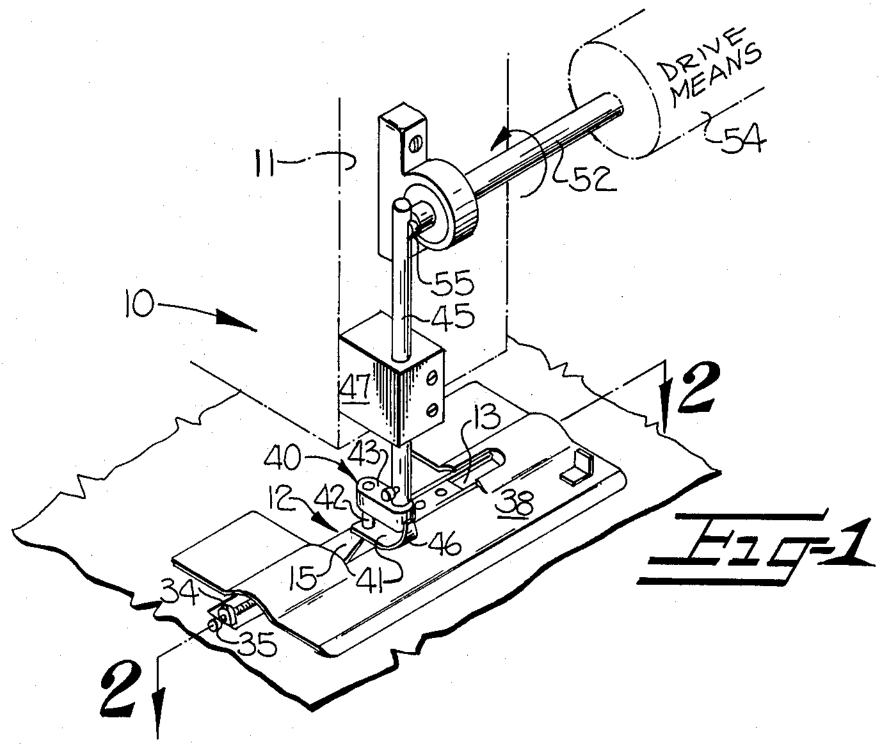
FIGURE 1 is a perspective view of the cutting mechanism of this invention.

Referring now to the drawings, there is shown in

FIGURE 1 the cutting mechanism of this invention, generally referred to by the reference numeral 10. This cutting mechanism 10 includes a stationary frame 11 of any desired form. The cutting mechanism 10 further includes a cutter assembly 12 mounted on the stationary frame 11 comprising a holder 13, a fixed blade 14 and a movable blade 15. As may be seen in FIGURE 5, the holder has apertures 16, 17, 20, 21 and 22 therein. The fixed blade 14 has apertures 23 and 24 therein and the movable blade 15 has elongated apertures 25 and 26 therein.

In the assembled condition of the cutter assembly 12, the fixed blade 14 and the movable blade 15 are secured to the holder 13 by means of short screws 27, 30 and 31. The screw 31 fits through apertures 24 in the fixed blade 14 and into aperture 21 in the holder 13 and the screw member 30 fits through aperture 23 in the fixed blade 14 and into aperture 20 in the holder 13 to secure the fixed blade 14 to the holder 13. In like manner, the screw 27 fits through elongated aperture 26 in the movable blade 15 and into aperture 17 in the holder 13 to secure the movable blade 23 in position on the holder 13.

Figure 2:
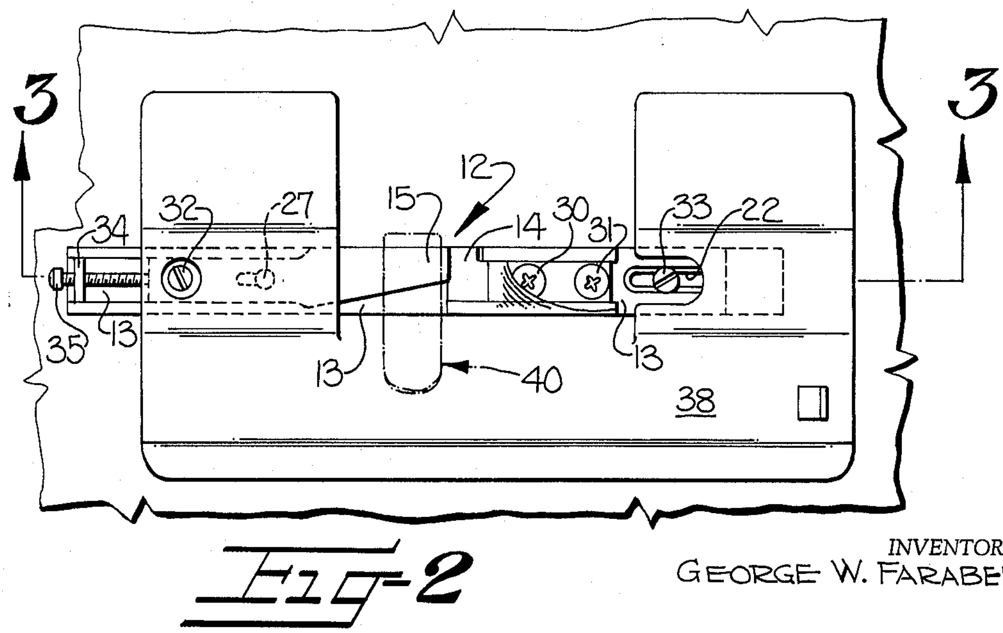
FIGURE 2 is a top plan view of the cutter member taken substantially along the lines 2—2 of FIGURE 1.

To secure the cutter assembly 12 to the fixed frame 11 of the machine, elongated screws 32 and 33 are provided. Elongated screw 33 extends through elongated aperture 22 in the holder 13 and is secured to the machine frame 11. Elongated screw 32 extends through elongated aperture 25 in the movable blade 15 and through aperture 16 in the holder 13 and is secured to the stationary frame 11 of the machine. The movable blade 15 may be adjusted longitudinally of the holder 13 and toward or away from the fixed blade 14 because of the provision of the elongated apertures 25 and 26 in the movable blade 15. This adjustment is accomplished by loosening screws 32 and 27 so that movable blade 15 may be moved toward or away from the fixed blade 14. To further facilitate this adjustment a flange 34 is provided on holder 13. A screw threaded member 35 is threaded through the flange 34 to bear upon the rear end of movable blade 15 such that the screw threaded member 35 may be adjusted toward or away from the fixed blade 14 to allow movement of the movable blade 15 toward and away from the fixed blade 14 and to further lock the movable blade 15 in the desired adjusted position. To aid the passage of material M over the ends of the cutter member 12, a cover plate 38 is provided, as shown in FIGURES 1 and 2, which is secured to the frame 11 and overlies the end portions of cutter member 12.

The movable blade 15 is constructed of a resilient material such that the cutting edge 36 thereof may be moved vertically downward, upon the application of force to contact the cutting edge 37 of fixed blade 14 to cut the material M as it passes through the cutting mechanism in a manner to be hereinafter described. It is desirable that the cutting edges 36 and 37 of the blades 15 and 14 form a slight angle with respect to a substantially vertical plane perpendicular to their top surfaces, as shown in FIGURE 4, and that the vertex of these angles slightly overlap each other so that the blades will contact each other when the movable blade 15 is moved downwardly. A suitable angle for the cutting edge 36 with respect to a substantially vertical plane has been found to be between 9° and 11° or preferably about 10°, and a suitable angle for the cutting edge 37 with respect to a substantially vertical plane has been found to be between 0°–50′ and 1°–10′ or preferably about 1°. It is also desirable that the cutting edge 37 be of a generally triangular configuration, as shown in FIGURES 5 and 6, and that the top edge of this surface from a slight angle with respect to a horizontal plane, as shown in FIGURE 6, so that contact of the movable blade 15 with the fixed blade 14 will begin at the vertex of that angle to insure a clean cut in the material M. A suitable angle for the cutting edge 37 with respect to a horizontal plane has been found to be between 7° and 9° or preferably about 8°. It is also necessary that the top surface of the movable blade 15 form a slight angle with respect to a horizontal plane, as shown in FIGURES 4 and 8, so that the cutting surface 36 is disposed above the cutting surface 37 for threading and movement of the material M. A suitable angle for the top surface of the movable blade 15 with respect to a horizontal plane has been found to be between 1° and 2° or preferably about 1°–12′.

To actuate the cutting blades 14 and 15 to move or apply force to the movable cutting blade 15 to move same downwardly into contact with the cutting blade 14, a hammer member is provided, generally referred to by the reference numeral 40. This hammer member 40 comprises a foot or contact portion 41 secured by stud 42 to a block member 43. The block member 43 is secured by stud 44 to reciprocating shaft 45. It is noted that the foot portion 41 is laterally offset with respect to the reciprocating shaft 45 as a safety feature to prevent an operator from placing his finger under the foot portion 41. As a further safety feature, a shield 46 is provided which is secured to the block portion 43 and to the foot portion 41, as shown in FIGURES 1 and 6.

The reciprocating shaft 45 passes through an aperture in a bearing block 47 which is secured to the stationary frame 11. The shaft 45 is maintained in a non-rotating condition in the bearing block 47 by shanked screw threaded member 50 carried by the bearing block 47, as shown in FIGURE 7. The shank end of the member 50 extends into a narrow elongated slot 51 to allow the shaft 45 to move up and down in a reciprocating movement but which will prevent the shaft 45 from rotary movement.

To reciprocate the shaft 45 up and down to bring the foot portion 41 in contact with the movable blade 15 to effect the above described cutting action, a rotating shaft 52 is provided. The rotating shaft 52 is retained in a bearing 53 mounted on the stationary frame 11. The rotating shaft 52 is driven by any suitable arrangement and drive means are schematically illustrated in FIGURE 1 and referred to by the reference numeral 54. On the forward end of shaft 52, as may be seen in FIGURES 1, 6 and 7, a cam 55 is eccentrically mounted on the face of the shaft 52. This cam 55 fits into a slot 56 provided in the upper end of reciprocating shaft 45 to thereby reciprocate shaft 45 up and down as the rotating shaft 52 is rotated, in a manner well known to those with ordinary skill in the art. In operation, the rotation of shaft 52 and the reciprocation of shaft 45 are so timed as to provide intermittent strokes of the hammer mechanism 40 on the movable blade 15 to effect cutting of the material M as it is fed through the mechanism in a manner to be hereinafter described.

During the cutting or trimming operation, a web of material M is fed to the cutting mechanism as shown in FIGURE 3. This material M is folded back upon itself to form a double layer of material with the free edge of material turned under. The material in this turned under condition is led to the cutter assembly 12 and is threaded through the cutter member such that the free edge is disposed under the movable blade 15 and the top layer of material overlies both the movable blade 15 and the fixed blade 14. The material M may be pulled through this cutting mechanism by any convenient means such as feed rolls, etc. (not shown). The cutting of this turned under free edge of material is effected by the reciprocation of hammer mechanism 40, in the manner described above, which contacts the upper layer of material M to press the upper layer of material down against movable blade 15 to thus cause movable blade 15 to come into contact with fixed blade 14 to effect cutting of the turned under free edge which is disposed under the movable blade 15.

In the drawings and specification there has been set forth a preferred embodiment of the invention and, although specific terms are employed, they are used in a generic and descriptive sense only and not for purposes in limitation, the scope of the invention being defined in the claims.

What is claimed is:

1. A cutting mechanism, adapted to cut the turned-under free edge only of a turned-under double layer of material passing through said mechanism, comprising a stationary frame, a first substantially horizontally extending resilient cutter blade having one end thereof mounted stationary on said frame and having a cutting surface on the other free end thereof which is normally spaced from said frame so that the turned-under edge of the turned-under material will pass through the space defined by said cutting surface and said frame, a second substantially horizontally extending cutter blade mounted stationary on said frame and having a cutting surface on one end thereof normally spaced below the cutting surface on said first cutter blade and disposed in mating relationship thereto, and a reciprocating hammer mechanism associated with said first resilient cutter blade and adapted to intermittently apply a downward force thereto to intermittently move the cutting surface of said first cutter blade into engagement with the cutting surface of said second cutter blade for cutting the turned-under edge only of the turned-under material passing through said cutting mechanism.

2. A cutting mechanism, as set forth in claim 1, in which said first cutter blade is adjustably mounted so that the stationary position thereof may be adjusted toward and away from said second cutter blade.

3. A cutting mechanism, as set forth in claim 1, in which said reciprocating hammer mechanism comprises a rotating shaft secured to said frame, a cam eccentrically carried on one end of said rotating shaft, a reciprocating shaft having a slot therein cooperating with said cam to effect reciprocating movement of said reciprocating shaft, and a foot portion carried by said reciprocating shaft and adapted to intermittently contact said first cutter blade to effect cutting action of said cutter blades.

References Cited by the Examiner

UNITED STATES PATENTS

| | | | |
|---|---|---|---|
| 811,816 | 2/1906 | Bergen | 234—119 |
| 1,848,863 | 3/1932 | Altvater | 83—601 |
| 2,850,093 | 9/1958 | D'Angelo et al. | 83—628 X |

FOREIGN PATENTS

| | | |
|---|---|---|
| 665,788 | 1/1952 | Great Britain. |

WILLIAM S. LAWSON, *Primary Examiner.*